(12) United States Patent
Ohira (10) Patent No.: US 7,477,414 B2
(45) Date of Patent: Jan. 13, 2009

(54) IMAGE FORMING APPARATUS AND METHOD OF CERTIFICATING PASSWORD

(75) Inventor: Shinji Ohira, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 933 days.

(21) Appl. No.: 11/024,221

(22) Filed: Dec. 27, 2004

(65) Prior Publication Data

US 2006/0139682 A1 Jun. 29, 2006

(51) Int. Cl.
*G06K 15/00* (2006.01)
(52) U.S. Cl. ..................... 358/1.15; 358/1.16
(58) Field of Classification Search ............... 358/1.15, 358/1.16, 1.9, 2.1, 3.26, 3.28, 537, 400, 401, 358/443, 448
See application file for complete search history.

(56) References Cited

U.S. PATENT DOCUMENTS

2004/0134370 A1* 7/2004 Katamoto et al. .......... 101/484
2004/0230842 A1* 11/2004 Osada ....................... 713/202
2005/0066051 A1* 3/2005 Miwa et al. ................ 709/233

* cited by examiner

*Primary Examiner*—Jerome Grant, II
(74) *Attorney, Agent, or Firm*—SoCal IP Law Group LLP; Steven C. Sereboff; John E. Gunther (57) ABSTRACT

An image forming apparatus applied to a system where an image forming apparatus and a PC are connected to one another via a communication network. The image forming apparatus includes a plurality of boxes which store image data, a correspondence table which shows the correspondence between box numbers for specifying the boxes and passwords registered for the boxes, a collate section which receives a password from the PC, collates the received password with the passwords registered in the correspondence table, and detects the box number of the box in which the password coinciding with the received password has been registered and the box numbers of the boxes in which no password has been registered from the plurality of boxes, and a transmitting section which transmits a value indicating the box number detected by the collate section to the PC.

11 Claims, 9 Drawing Sheets

| Box number | Box name | Box password |
|---|---|---|
| 0 | Common | - |
| 1 | abc | 00001 |
| 2 | def | 22222 |
| 3 | ghi | 00001 |
| 4 | (Undefined) | |
| ⋮ | ⋮ | ⋮ |

PW: 00001

| Box number | 0 | 1 | 2 | 3 | 4 | 5 | 6 | 7 | ... |
|---|---|---|---|---|---|---|---|---|---|
| Use permit state | 1 | 1 | 0 | 1 | 1 | 1 | 1 | 1 | ... |

| Box number | Box name | Box password |
|---|---|---|
| 0 | Common | - |
| 1 | abc | 00001 |
| 2 | def | 22222 |
| 3 | ghi | 00001 |
| 4 | (Undefined) | |
| ⋮ | ⋮ | ⋮ |

| Box number | 0 | 1 | 2 | 3 | 4 | 5 | 6 | 7 | ... |
|---|---|---|---|---|---|---|---|---|---|
| Use permit state | 1 | 1 | 0 | 1 | 1 | 1 | 1 | 1 | ... |

| Box number | 0 | 1 | 2 | 3 | 4 | 5 | 6 | 7 | ... |
|---|---|---|---|---|---|---|---|---|---|
| Use permit state | 1 | 0 | 1 | 0 | 1 | 1 | 1 | 1 | ... |

| Box number | 0 | 1 | 2 | 3 | 4 | 5 | 6 | 7 | ... |
|---|---|---|---|---|---|---|---|---|---|
| Use permit state | 1 | 0 | 0 | 0 | 1 | 1 | 1 | 1 | ... |

IMAGE FORMING APPARATUS AND METHOD OF CERTIFICATING PASSWORD

BACKGROUND OF THE INVENTION

This invention relates to an image forming apparatus which has a box function of providing users with a plurality of storage areas as boxes which store print image data and in which passwords are registered, and more particularly to a method of certificating the password when a user uses a box.

The box function is such that the storage area of a storage unit, such as a hard disk, is divided into a plurality of subareas so that print image data (hereinafter, just referred to as image data) can be managed on an area basis. To use the box function, the image data, for example, read by a scanner or sent from a personal computer is stored temporarily in a box of the image forming apparatus. At a subsequent time, the box which has stored the image is specified from the operator section of the image forming apparatus or a personal computer connected to the communication network, thereby selecting the desired image data from a list of image data stored in the box, which enables the image to be print-output or transmitted by fax or e-mail. Using the boxes by individual or by use increases convenience for users.

Some of the image forming apparatuses with such a box function enable a password to be registered in a box to prevent the image data in the box from being accessed. Each time each box is accessed, the password is requested. The input password is collated with the password registered in each box beforehand. Only when both passwords coincide with each other, an instruction to, for example, store the image data or print-output the image data in the box is allowed to be given.

When a personal computer using the box function is connected to an image forming apparatus via a communication network, such as a LAN, the password registered in each box might be picked up by another personal computer connected to the communication network and be leaked out or deciphered. Once the password is deciphered by another person's personal computer, secret information on an individual stored in the box leaks out.

BRIEF SUMMARY OF THE INVENTION

It is an object of the present invention to provide a system capable of preventing the password of a box for storing image data provided in an image forming apparatus from leaking out.

In order to achieve the above object, according to one aspect of the present invention, there is provided a method of certificating a password for an image processing apparatus applied to a system where an image forming apparatus having a plurality of storage sections for storing image data and an image processing apparatus are connected to one another via a communication network, the method comprising: inputting a storage section ID for specifying the storage section and a password for the storage section ID; transmitting the input password to the image forming apparatus; receiving from the image forming apparatus bit train data indicating the one permitted to be used among the plurality of storage sections; and certificating the password input from the input section on the basis of the comparison between the received bit train data and the storage section ID input from the input section.

According to an embodiment of the present invention, information determining the user, including the box number, box name, and user name specified by the user, is not transmitted and only the password is transmitted to the image forming apparatus. On the basis of the collation of the box number specified by the user with the box number permitted to be used on the image forming apparatus side, the password is certificated on the personal computer side. Therefore, even if the data transmitted during certification is picked up, the correspondence between the user and the box registered by the user, that is, the password of each box, is prevented from being known.

DETAILED DESCRIPTION OF THE INVENTION

Hereinafter, referring to the accompanying drawings, an embodiment of the present invention will be explained.

Figure 1:
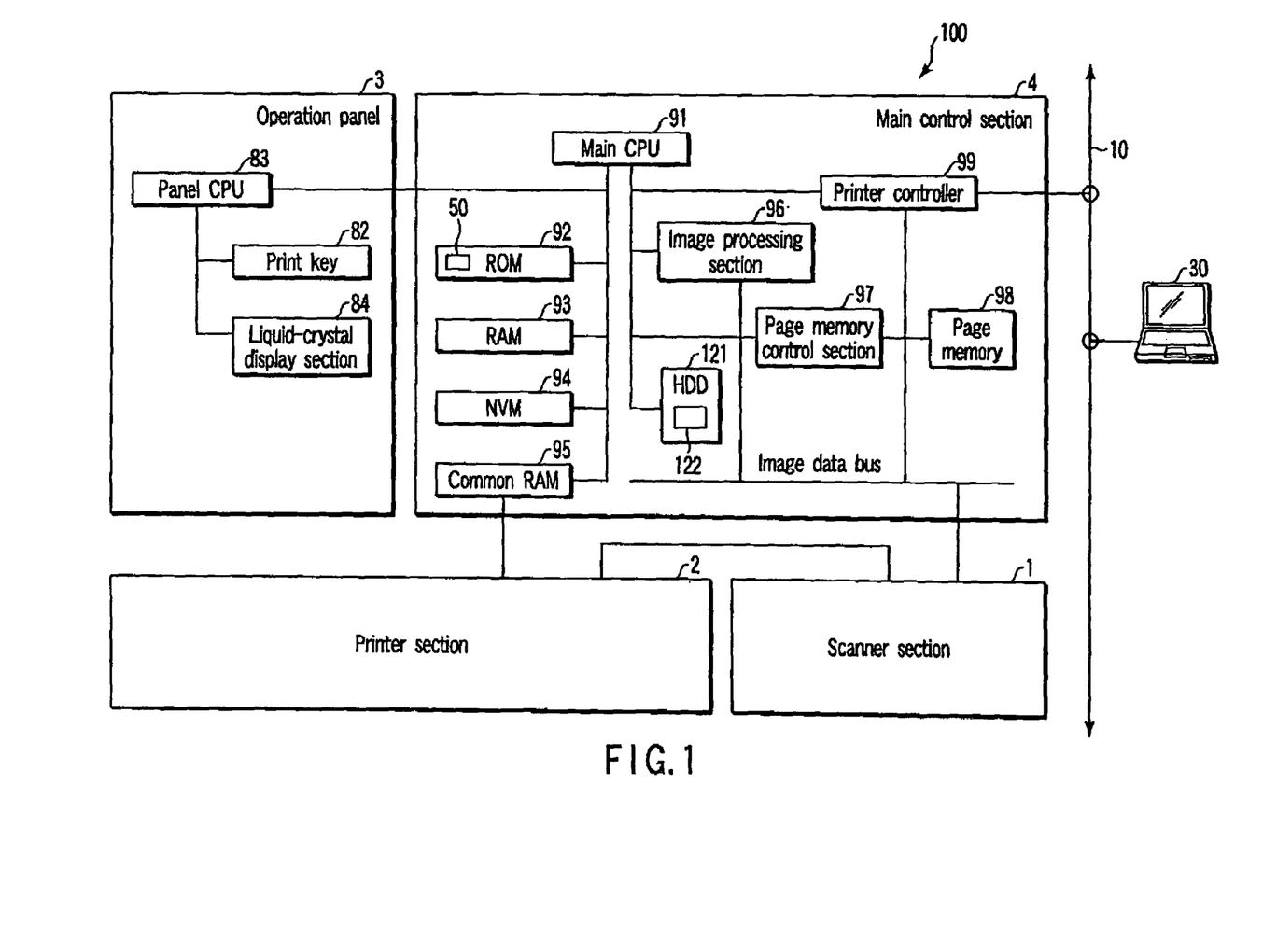
FIG. 1 is a block diagram schematically showing the configuration of the control system of an image forming apparatus to which the present invention is applied.

FIG. 1 is a block diagram schematically showing the configuration of the control system of an image forming apparatus to which the present invention is applied. The image forming apparatus, which is connected to a communication network 10, such as a LAN, functions as an MF (Multifunction peripheral). Hereinafter, the image forming apparatus is referred to as the MFP 100.

The MFP 100 comprises a scanner section 1 which reads a document image and supplies image data corresponding to the document image, a printer section 2 which forms an image on a sheet on the basis of the image data from the scanner section 1, an operation panel 3 which provides a user interface, and a main control section 4 which controls the MFP 100 comprehensively on the basis of a user instruction input via the operation panel 3.

The main control section 4 is composed of a main CPU 91, a ROM 92, a RAM 93, an NVM (nonvolatile memory) 94, a common RAM 95, an image processing section 96, a page memory control section 97, a page memory 98, and a HDD (hard disk drive) 121.

In the ROM 92, various control programs, including a collate section 50 related to the present invention, have been stored. The main CPU 91, which uses the RAM 93 as a work area, controls the MFP 100 comprehensively according to the control programs stored in the ROM 92. The main CPU 91 transmits an operation command to the printer section 2 and scanner section 1. The printer section 2 and scanner section 1 return a status to the main CPU 91.

The NVM 94, which is a nonvolatile memory backed up by a battery (not shown), holds its data when the power is turned off. The NVM 94 stores default values (initial setting values) for the individual hardware elements constituting the MFP 100. The common RAM 95 is used for two-way communication between the main CPU 91 and the printer section 2.

The image processing section 96 subjects the image data input from, for example, the scanner section 1, to image processes, including a screen process, a trimming process, and a masking process. The printer controller 99 receives image data including code data, such as character code, via the network 10 from an external device, such as a PC (personal computer). The printer controller 99 creates character image data in the size and at the resolution corresponding to the character size and resolution assigned to the character code when the received data is character code and stores the resulting data in the page memory 98. Then, the image data is printed on the printer section 2.

As described above, the MFP 100 also functions as a network printer which prints an image on a sheet using the printer section 2 on the basis of the image data transmitted from the PC 30 connected to the network 10. The MFP 100 further functions as a network scanner which reads a document image using the scanner section 1 according to a command from the PC 30 connected to the network 10 and transmits the document image data to the PC.

The page memory control section 97 controls the storing and reading of image data into and from the page memory 98. The page memory 98 is so configured that it has as many areas as can store, for example, two pages of image data and that it can store in pages the data obtained by compressing the image data from the scanner section 1 or printer controller 99. The HDD 121 is used when, for example, many pages of document image data have to be stored.

Figure 2:
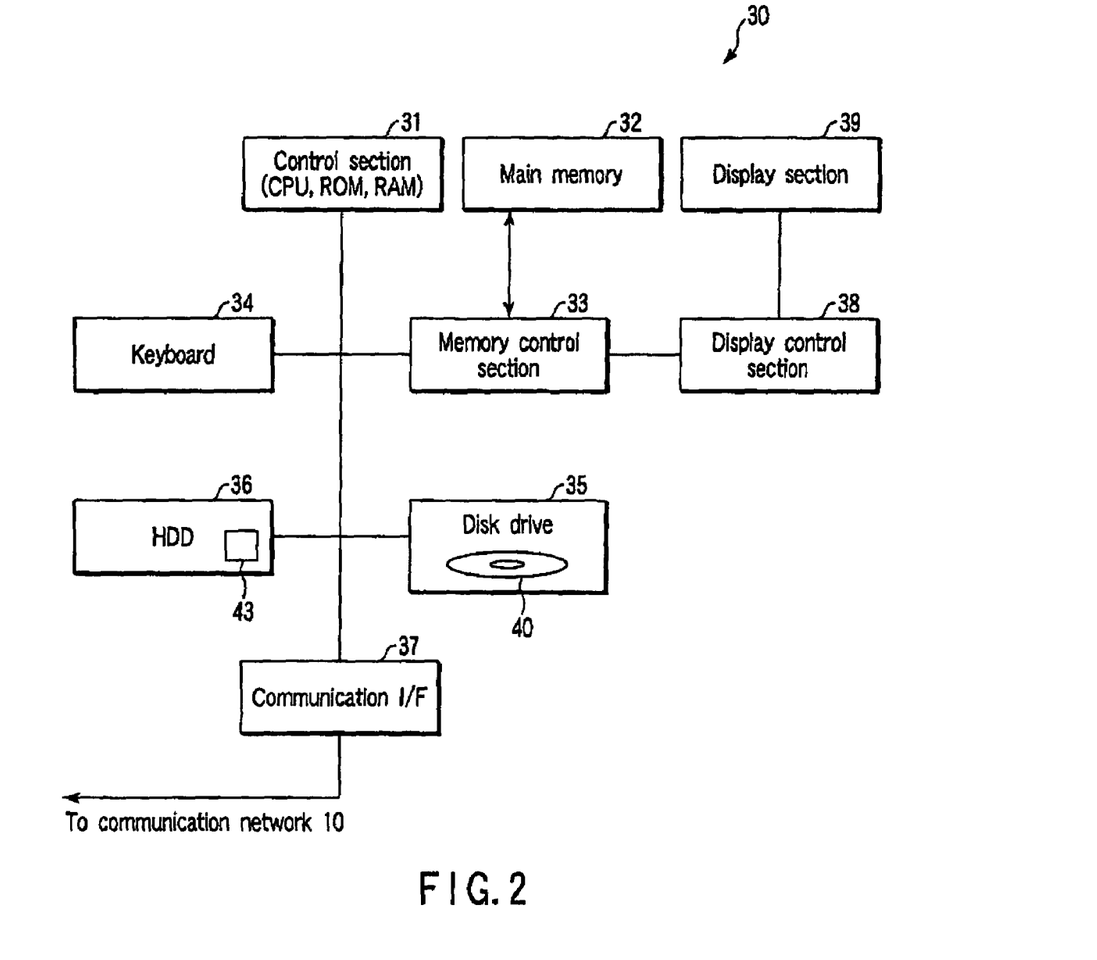
FIG. 2 is a block diagram schematically showing the configuration of the PC 30.

FIG. 2 is a block diagram schematically showing the configuration of the PC 30 serving as the image processing apparatus.

The PC 30 includes a control section 31, a memory 32, a memory control section 33, a keyboard 34, a disk drive 35, a hard disk drive (HDD) 36, a communication interface (I/F) 37, a display control section 38, and a display section 39.

The control section 31, which includes a ROM storing control programs and a RAM used as a work area, controls the PC 30 comprehensively on the basis of a user instruction input from the keyboard 34.

The disk drive 35 records and reproduces information onto and from an optical disk 40, such as CD or DVD. Under the control of the control section 31, the memory control section 33 records information, such as image data, supplied from the disk drive 35 or communication interface 37 into the main memory 32 or supplies the information to the display control section 38. Furthermore, under the control of the control section 31, the memory control section 33 supplies the information recorded in the main memory 32 to the HDD 36, disk drive 35, communication interface 37, or display control section 38. The display control section 38 converts the image data from the memory control section 33 into data suitable for display on the display section 39 and causes the display section 39 to display the data.

Hereinafter, the box function related to the invention will be explained in detail.

In this specification, a box is a storage area in which, for example, the image data read by the scanner section 1 or the image data transmitted from the PC 30 is stored temporarily. A box is provided as a box area 122 in, for example, the HDD 121. Boxes can be allocated to a plurality of users in a one-to-one correspondence. Some of the boxes permit anyone to access them and others require the passwords to be certificated to access them. From the operation panel 100 or PC 30, the user can select the box the user has registered and output and print the image data stored in the box on the printer section 2 or transmit the image data by fax or e-mail via the communication network 10.

First, the setting up or registering of a box will be explained. A box can be registered from the MFP 100 or PC 30.

Figure 3:
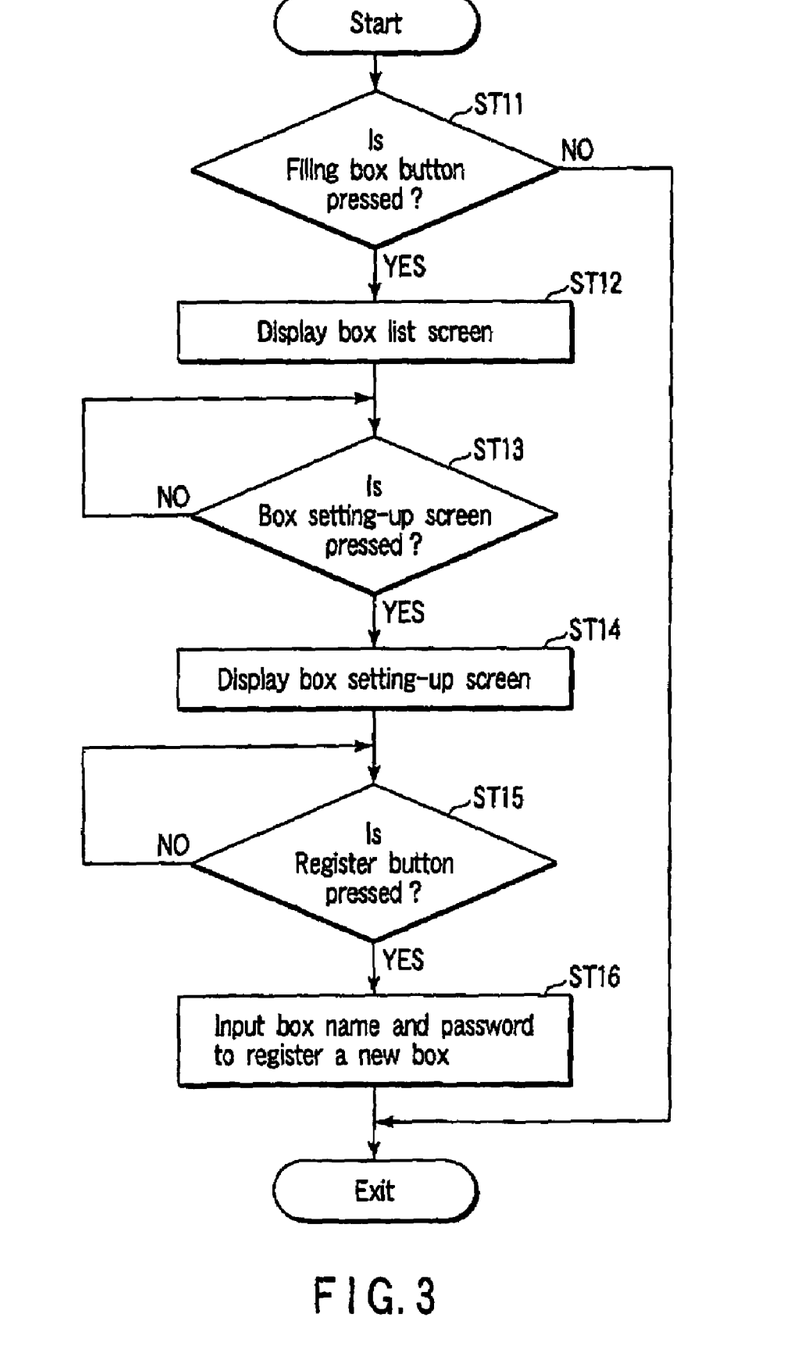
FIG. 3 is a flowchart to help explain the operation when a box is registered using the operation panel 3 of the MFP 100.

FIG. 3 shows the operation when a box is registered using the operation panel 3 of the MFP 100. the functions related to boxes, including the registration of boxes, have been stored together with the collate section 50 explained later in, for example, the ROM 92 in the form of a program executed by the CPU 91.

Figure 4A:
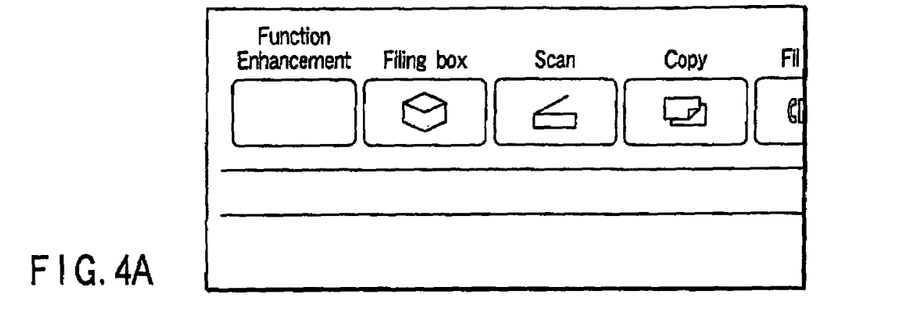
FIGS. 4A to 4C show various images appearing on the liquid-crystal display section 84 of the operation panel 3 when various buttons and boxes on the operation panel 3 are registered.

First, the CPU 91 determines whether "Filing Box" button has been pressed as shown in step ST11. FIG. 4A shows various buttons provided on the operation panel 100. To register a box, the user presses Filing Box button first.

Figure 4B:
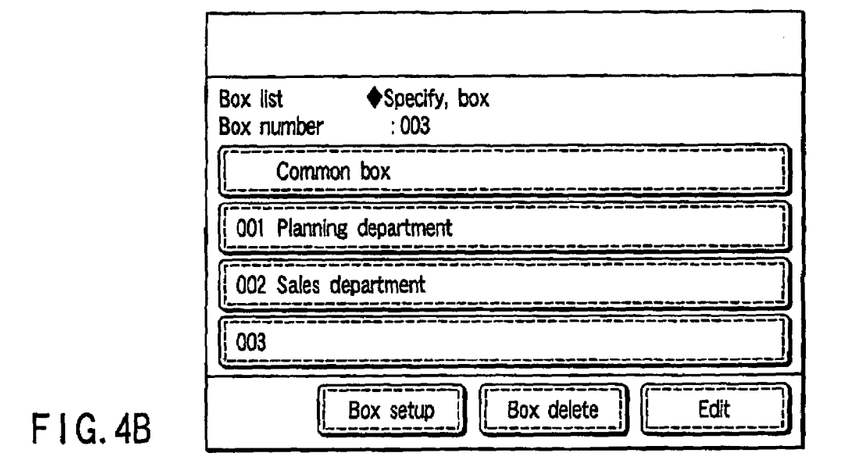

When Filing Box button is pressed (YES in step ST11), the CPU 91 displays a box list screen as shown in FIG. 4B on the liquid-crystal display section 84 (ST12). The user selects an empty box arbitrarily from box numbers 001 to 200 and then presses "Box Setting-up" button.

Figure 4C:
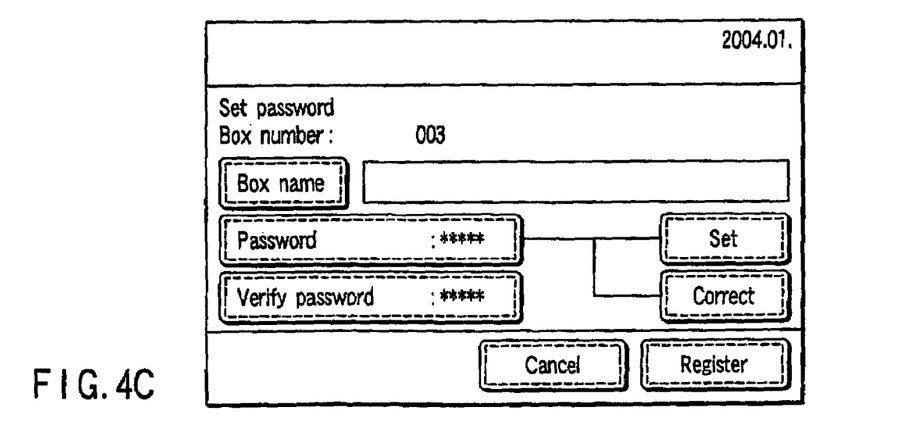

When "Box Setting-up" button is pressed (YES in step ST13), the CPU 90 displays a box setting-up screen as shown in FIG. 4C (ST14). Using buttons on the operation panel, the user enters the box name in kanji characters or Arabic numerals and the password in Arabic numerals. The password is an arbitrary input item. Even if the password is not input (registered), the user can use the box function. After entering the box name and password, the user presses "Register" button.

When Register button is pressed (YES in step ST15), the CPU 90 receives the box name and password and registers a new box in the HDD 121 (ST16).

Next, the operation when a box is registered from the PC 30 will be explained.

Figure 5:
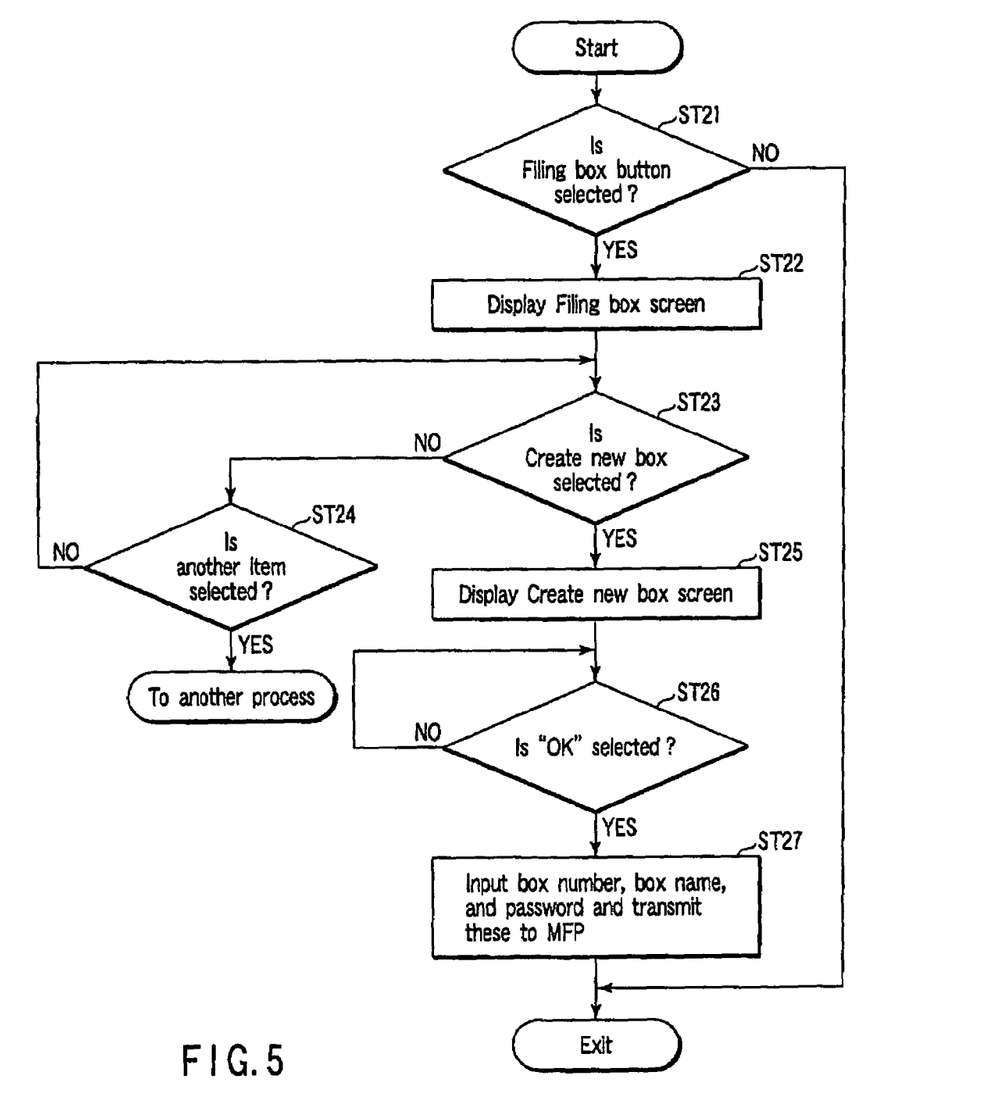
FIG. 5 is a flowchart to help explain the operation when a box is registered in the MFP 100 from the PC 30 via the communication network 10.
Figure 6A:
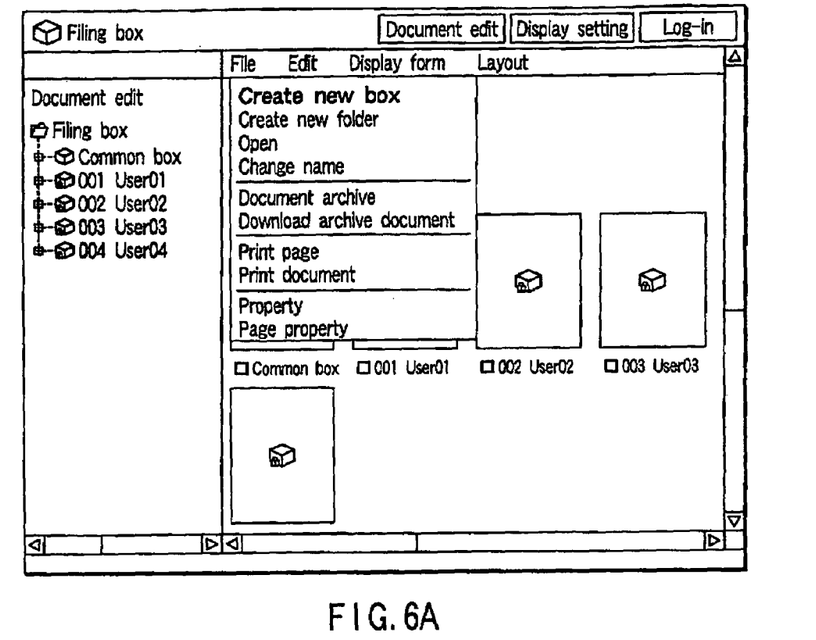
FIGS. 6A and 6B show various screens appearing on the display section 39 of the PC 30 when a box is registered.
Figure 6B:
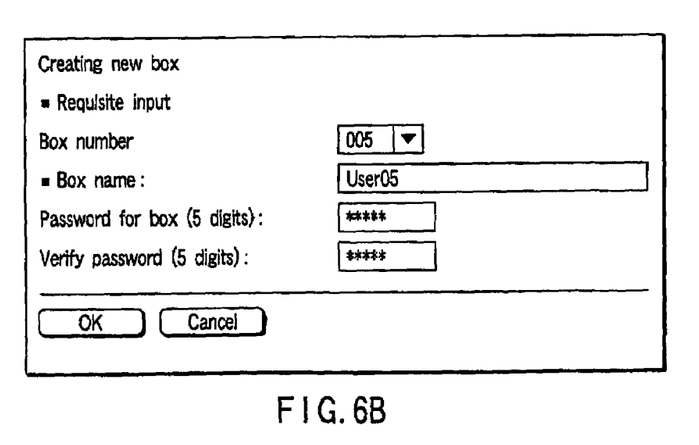

FIG. 5 shows the operation when a box is registered in the MFP 100 from the PC 30 via the communication network 10. FIG. 6 shows various screens appearing on the display section 39 of the PC 30 when a box is registered.

First, the user selects "Filing Box" on an icon or menu screen. When "Filing Box" has been selected (YES in step ST21), the CPU 91 displays a filing box screen as shown in FIG. 6A on the display section 39 (ST22). The user selects "Create a new box" from "File" menu on the filing box screen.

When "Create a new box" has been selected (YES in step ST23), a new box creating screen as shown in FIG. 6B is displayed on the display section 39 (step ST25). If NO in step ST23, the CPU 91 determines whether another item has been selected (step ST24). If another item has been selected, the CPU 91 passes control to the process of another item. If not, the CPU 91 returns control to step ST23.

On the new box creating screen, the user selects a box number from "Box Number" drop-down menu and enters the box name into the "Box Name" field. Here, the box number or box name is a box ID specifying the box, that is, a storage section ID. Furthermore, the box numbers are serial numbers. The user enters a password into the password field and selects "OK". On the "Box Number" drop-down menu, the user cannot select a box number already registered. On the drop-down menu, only unregistered box numbers are displayed. The user can select an arbitrarily box number from them.

When "OK" has been selected (YES in step ST26), the CPU 91 receives the box number, box name, and password and transmits these pieces of information (step ST27). On the basis of the box number, box name, and password received from the PC 30 via the communication network 10, the MFP 100 registers a now box in the HDD 121.

When the user uses a box of the MFP 100 in which password has been registered to store or read the image data, the password is certificated. Hereinafter, password certification related to the present invention will be explained.

Figure 7A:
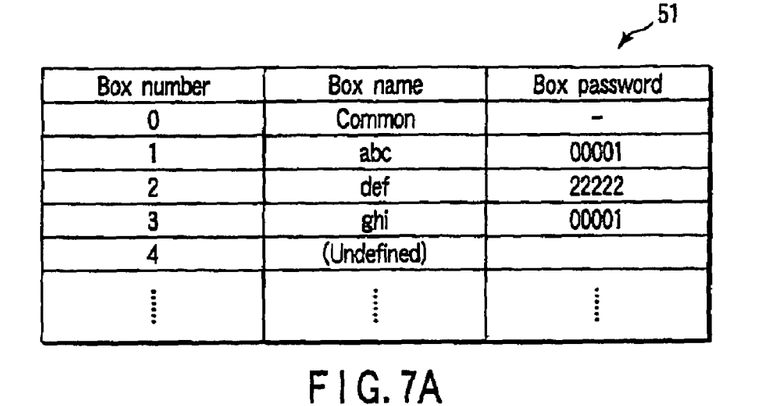
FIG. 7A shows an example of a box-password correspondence table.

When the power of the MFP 100 is turned on, the CPU 91 creates a box-password correspondence table on the RAM 93 as the initial setting of the apparatus. FIG. 7A is a box-password correspondence table 51 which shows the correspondence between box numbers, box names, and box passwords. Normally, the box-password correspondence table 51 is loaded from the HDD 121 into the RAM 93. A blank box-password correspondence table 51 (no password has been registered) is stored beforehand in, for example, the ROM 92. When the power of the MFP 100 is turned on for the first time, or when the box-password correspondence table is reset, a blank box-password correspondence table is loaded into the RAM 93. When a password is newly registered, the box-password correspondence table 51 in the HDD 121 is updated.

As shown in FIG. 7A, the box with box number 0 is a common box in which no password is set. Any user can use the common box. In the example of FIG. 7A, the box name "abc" and the password "00001" have been registered in the box with box number 1. The box name "def" and the password "22222" have been registered in the box with box number 2. The box name "ghi" and the password "00001" have been registered in the box with box number 3. In this way, the same password can be registered in different boxes. Neither box nor password has been registered in a box whose box number is equal to or larger than 4. That is, a box whose box number is equal to or larger than 4 is an undefined box.

Figure 8:
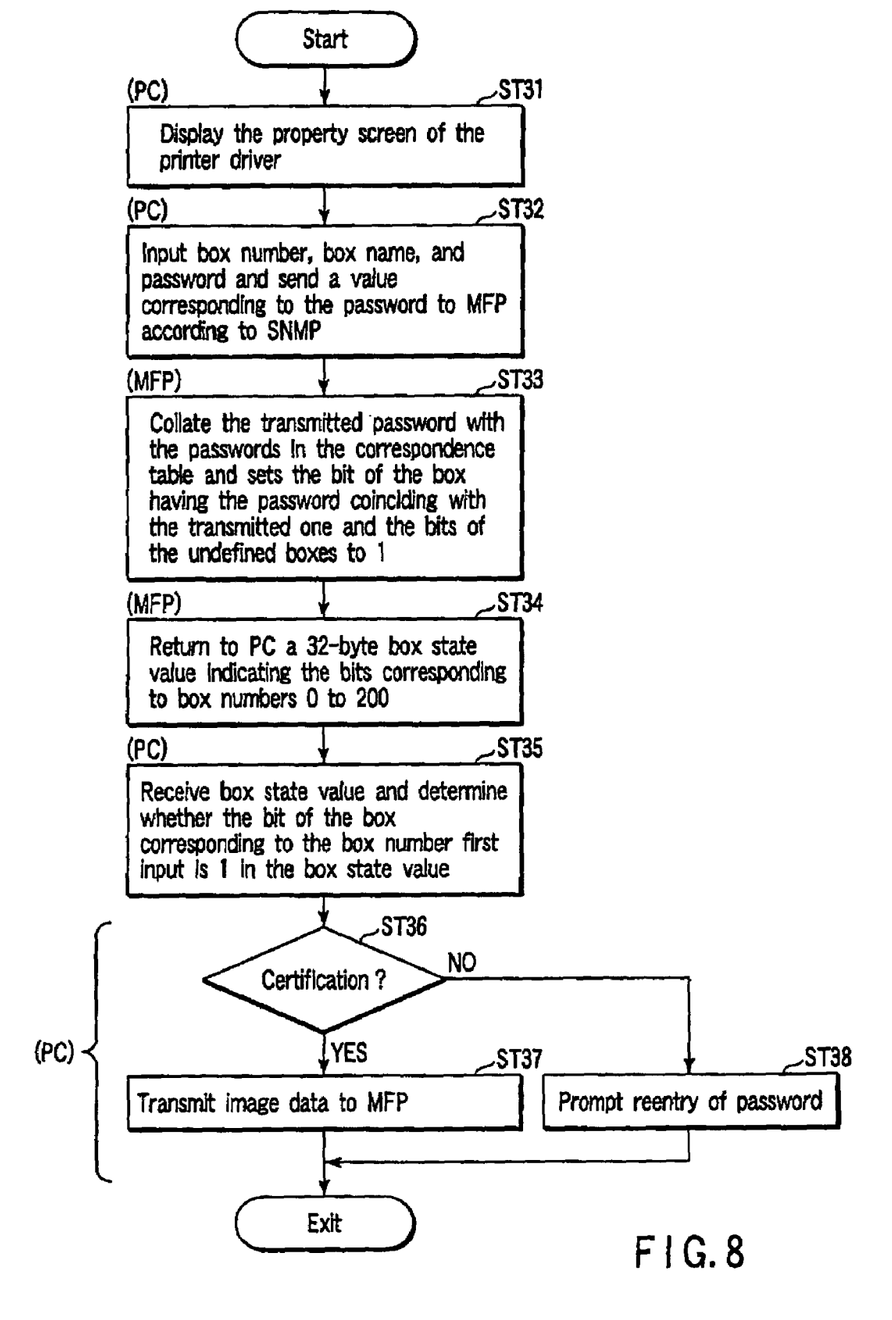
FIG. 8 is a flowchart to help explain an embodiment of the password certificating operation.

FIG. 8 is a flowchart to help explain an embodiment of a password certificating operation. In this example, explanation will be given about a case where the image data from the PC is stored in a specific box in the MFP. The same holds true when the image data is read from a box or when the image data is printed. The program for performing the certification is the collate section 50 stored in, for example, the ROM 92 on the MFP 100 side and a printer driver 43 stored in the HDD 36 on the PC 3 side. The collate section 50 may be configured as an independent hardware entity, not as a program executed by the CPU 91.

Figure 9A:
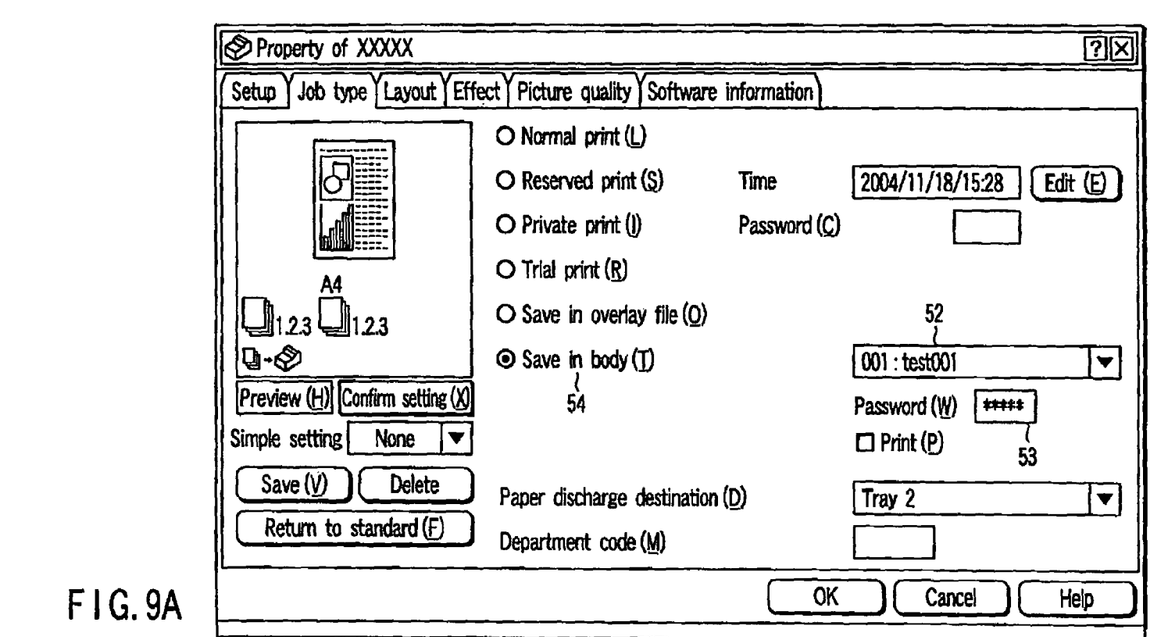
FIGS. 9A and 9B show property screens of the printer driver.

When storing the image data from the PC 30 into a box of the MFP 100, the user first selects, for example, the item "Property" for the printer driver on a work menu screen or the like of the PC 30. In response to the selection, the control section 31 of the PC 30 displays a property screen as shown in FIG. 9A on the display section (ST31). On the property screen of the printer driver, the user selects box number 52 (box name), enters a 5-digit password 53, checks the item "Save in the body" 54, and selects "OK".

Here, the printer driver is a tool which enables the PC 30 to print using a printer (MFP 100) connected to the PC 30, that is, an application software program. The embodiment applied to the PC 30 side is built in the printer driver. The printer driver is provided for the user in such a manner that it is stored in, for example, a CD. The printer driver is then copied from the CD to the HDD 36 for use. Alternatively, the printer driver is downloaded from a server connected via a communication network, such as the Internet, into the HDD 36 of the PC 30 for use. The block 43 in the HDD 36 in FIG. 2 represents the printer driver stored this way. Furthermore, to increase the processing speed, the printer driver 43 is copied to a semiconductor memory, such as a RAM. Then, it is used when printing is done, when the image data is stored in a box, or when the image data is read from the box. The printer driver may be configured as an independent hardware entity, not as a program executed by the CPU 31.

Returning to FIG. 8, in step ST32, after receiving the box number, box name, and 5-digit password input by the user, the PC 30 converts the password 00000 to 99999 into 1 to 100000. This is the process necessary to transmit information according to SNMP (Simple Network Management Protocol). SNMP is a protocol for monitoring and controlling the communication devices connected to a network, including computers and terminals. In SNMP, a device to be controlled has a management information database called MIB (Management Information Base). That is, MIB is information opened to the public for network devices managed in SNMP to make their state known to the outside. In this specification, the box-password correspondence table 51 is used as the MIB. If a password has not been entered yet in step ST32, the password is registered as "10001" and the process is continued (the user is allowed to enter data). The control section 31 of the PC 30 transmits a value corresponding to such a password to the MFP 100 according to SNMP.

Figure 7B:
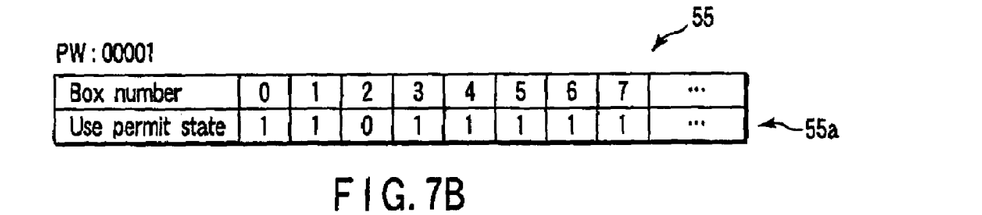
FIGS. 7B to 7D show examples of the box state table 55.

In step ST33, the CPU 91 of the MFP 100 receives the value corresponding to the password transmitted from the PC 30 and returns the value to the original password. On the basis of this password, a box state table is created in, for example, the RAM 93 of the MFP 100. FIG. 7B shows an example of the box state table 55. The box state table 55 lists the box numbers of boxes the user of the PC 30 which has sent the password can use.

In the box state table 55, one bit is assigned to each of the boxes with box numbers 0 to 200. The CPU 91 collates the passwords registered in the password correspondence table 51 of FIG. 7A with the received password. The CPU 91 detects the box whose password coincides with the received one and sets the bit of the box to 1. In addition, the CPU 91 sets all of the bits of the undefined (unregistered) boxes (in FIG. 7A, the boxes whose box number is equal to or larger than 4) to 1. This is the operation necessary to register the box so as to correspond to the password input by the user when the user has selected an unidentified box. The bit of a box whose password does not coincide with the received password is set to 0. In this way, the collation of passwords is carried out in step ST33.

Figure 7C:
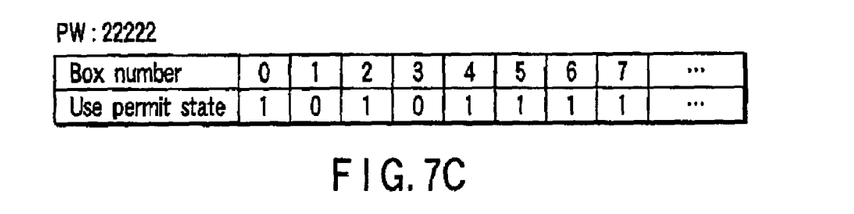
Figure 7D:
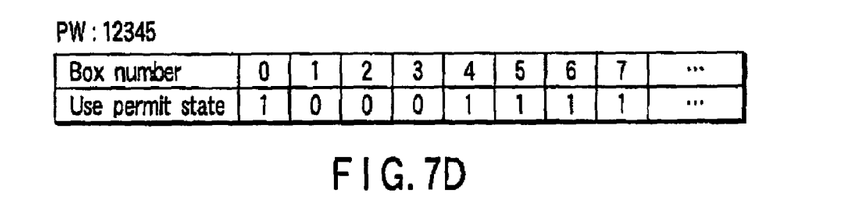

FIG. 7B shows a box state table 55 created when the password correspondence table 51 has been set as shown in FIG. 7A and the password (PW) received from the PC 30 is "00001". FIG. 7C shows a box state table 55 created when the password correspondence table 51 has been set as shown in FIG. 7A and the password received from the PC 30 is "22222". FIG. 7D shows a box state table 55 created when the password correspondence table 51 has been set as shown in FIG. 7A and the password received from the PC 30 is an unregistered password, such as "12345".

Figure 7E:
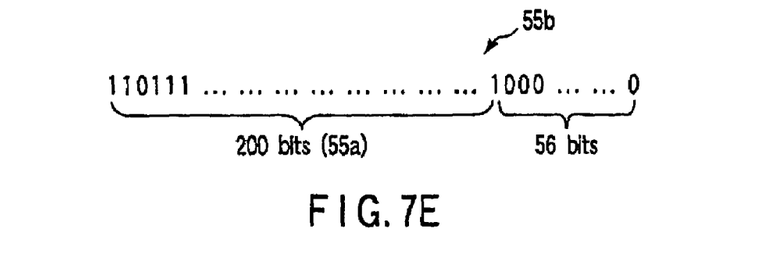
FIG. 7E shows an example of a box state value.

As in step ST34, the CPU 91 sends back to the PC 30 a 32-byte value corresponding to box numbers 0 to 200 (0 is common) of the boxed registered. That is, the CPU 91 transmits to the PC 30 a 256-bit (32-byte) value (bit train data) obtained as a box state value 55b by allocating a bit train 55a containing 200 bits listed in the second row of the box state table 55 ("11011 . . . " in FIG. 7B) to the higher-order 200 bits and setting the lower-order 56 bits to 0 (or 1). FIG. 7E shows an example of the box state value 55b. The box state value 55b, which is transmitted on the basis of the box state table 55 shown in FIG. 7B, is composed of a 200-bit bit train 55a and 56 bits of 0s.

As in step ST35, when receiving the box state value from the MPF 100, the PC 30 compares the box state value with the box number input by the user in step ST32. If the bit corresponding to the box number input by the user has been set to 1 in the box state value 55b, it is determined that the result of the certification is acceptable (YES in step ST36) and the image data specified by the user is transmitted to the MFP 100 (step ST37). As described above, in this invention, the PC 30 certificates the password by using the box number input by the user and the box state value 55b transmitted from the MFP 100.

Figure 9B:
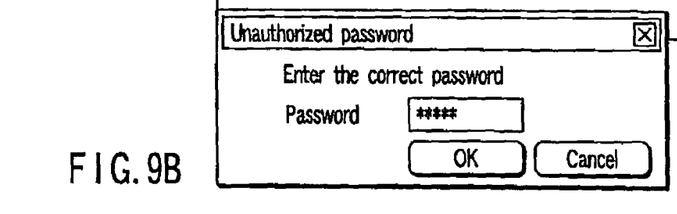

The MFP 100 receives the image data transmitted from the PC 30 and records the data in the box corresponding to the password received in step ST33. If it is determined that the result of the certification is unacceptable (NO in step ST36), the CPU 91 displays a password reenter screen as shown in FIG. 9B, thereby prompting the user to enter the password again (step ST38). Here, if it is determined that the result of the certification is unacceptable (NO in step ST36), a new box may be registered in the MFP 100 by using the unregistered password input in step S32.

As described above, in the embodiment, SNMP is used as a communication protocol and the password input by the user is sent from the PC to the MFP. The MFP checks the box number coinciding with the password input by the user and the number of an undefined box on the basis of the password registered in each box. The MFP allocates the bits corresponding a Public box (a box all of the users can share without a password), box 1, box 2, box 3, ... to 32-byte data from left to right in sequence. The 32-byte data which has the bit of the box where the password coinciding with the transmitted password has been registered and the bits of the undefined boxes set to 1 is sent back as the box state value 55b to the user-side PC. When the bit corresponding to the box number specified by the user is 1, the PC printer driver 43 (and CPU 91) determines that the result of the certification is acceptable and sends the image data (or print data) to the box.

In the prior art, the user name and password input from the user's PC were sent directly to the MFP. When the certification was successful, the MFP sent back a specific value, such as 1, as a return value to the PC. Even when the certification was unsuccessful, the MFP sent back a specific value, such as −3, to the PC. Therefore, if the communication was picked up, when the certification was successful, there was a possibility that the user name and password would be known by an outsider.

In this embodiment, when a box is used, information, including the box number specified by the user, the box name, and the user name determining the user, is not transmitted. Only the password is transmitted from the PC to the MFP. The printer driver 43 certificates the input password by collating the box specified by the user with the box permitted to be used on the MFP side. That is, information as to whether the certification is successful or not is not transmitted via the communication network. Therefore, even if the data transmitted during the certification has been picked up, the correspondence between the user and the box registered by the user, that is, the password of the box, is prevented from being known.

The above description is the embodiments of the present invention, and the apparatus and the method of the present invention are not limited thereto, and various modified examples can be implemented. Such modified examples are included in the present invention. Further, apparatuses or methods which are configured by appropriately combining the components, the functions, the features, or the steps of the method in the respective embodiments are included in the present invention.

What is claimed is:

1. An image forming apparatus applied to a system where an image forming apparatus and an image processing apparatus are connected to one another via a communication network, the image forming apparatus comprising:
    a plurality of storage sections which store image data;
    a correspondence table which shows the correspondence between storage section IDs for specifying the storage sections and passwords registered for the storage sections;
    a collate section which receives a password from the image processing apparatus, collates the received password with the passwords registered in the correspondence table, and detects the storage section ID of the storage section in which the password coinciding with the received password has been registered and the storage section IDs of the storage sections in which no password has been registered from said plurality of storage sections; and
    a transmitting section which transmits a value indicating the storage section ID detected by the collate section to the image processing apparatus.

2. The image forming apparatus according to claim 1, wherein the value indicating the storage section ID detected is bit train data in which one bit is allocated to each of the storage sections, the bit of the storage section in which the password coinciding with the received password has been registered and the bits of the storage sections in which no password has been registered are set to 1, and the bits of the storage sections in which a password not coinciding with the received password has been registered are set to 0.

3. The image forming apparatus according to claim 2, wherein each storage section ID includes a storage section serial number, and the bit arrangement of the bit train data coincides with the order of storage section serial numbers.

4. The image forming apparatus according to claim 1, wherein the storage section number ID includes a storage section name.

5. The image forming apparatus according to claim 1, wherein the transmitting section uses SNMP as a communication protocol and the correspondence table corresponds to NIB in SNMP.

6. A printer driver which is provided in an image processing apparatus applied to a system where an image forming apparatus having a plurality of storage sections for storing image data and an image processing apparatus are connected to one another via a communication network and which enables the image processing apparatus to print using the image forming apparatus, the printer driver comprising:
    an input section which inputs storage section ID for specifying a storage section and password for the storage section ID;
    a transmitting section which transmits the password input from the input section to the image forming apparatus;
    a receiving section which receives bit train data indicating a storage section permitted to be used among said plurality of storage sections; and
    a certificating section which certificates the password input from the input section on a basis of the comparison between the received bit train data and the storage section ID input from the input section.

7. The printer driver according to claim 6, wherein
    the storage section ID is a storage section serial number and the bit arrangement of the bit train data indicating the storage section permitted to be used coincides with the order of a storage section serial numbers, and the certificating section authenticates the password input from the input section as the legitimate password, when the bit position corresponding to the storage section serial number input from the input section is set to 1 in the bit train data.

8. A system in which an image forming apparatus and an image processing apparatus are connected to one another via a communication network, wherein the image forming apparatus comprises:

(1a) a plurality of storage sections which store image data;

(1b) a correspondence table which shows the correspondence between storage section IDs for specifying the storage sections and passwords registered for the storage sections;

(1c) a collate section which receives a password from the image processing apparatus, collates the received password with the passwords registered in the correspondence table, and detects the storage section ID of the storage section in which the password coinciding with the received password has been registered and the storage section IDs of the storage sections in which no password has been registered, from said plurality of storage sections; and (1d) a transmitting section which transmits a value indicating the storage section ID detected by the collate section to the image processing apparatus, and the image processing section comprises a printer driver including:

(2a) an input section which inputs storage section ID for specifying a storage section and password for the storage section ID;

(2b) a transmitting section which transmits the password input from the input section to the image forming apparatus;

(2c) a receiving section which receives bit train data indicating the storage section permitted to be used among said plurality of storage sections; and (2d) a certificating section which certificates the password input from the input section on a basis of the comparison between the received bit train data and the storage section ID input from the input section.

9. A method of certificating a password for an image processing apparatus applied to a system where an image forming apparatus having a plurality of storage sections for storing image data and an image processing apparatus are connected to one another via a communication network, the method comprising:

inputting a storage section ID for specifying a storage section and a password for the storage section ID;

transmitting the input password to the image forming apparatus;

receiving from the image forming apparatus bit train data indicating a storage section permitted to be used among said plurality of storage sections; and certificating the password input from the input section on a basis of the comparison between the received bit train data and the storage section ID input from the input section.

10. The method according to claim 9, wherein the storage section ID is a storage section serial number and the bit arrangement of the bit train data indicating the storage section permitted to be used coincides with the order of storage section serial numbers, and the step of certificating the password authenticates the password input from the input section as the legitimate password, when the bit position corresponding to the storage section serial number input from the input section is set to 1 in the bit train data.

11. A storage medium used in an image processing apparatus applied to a system where an image forming apparatus having a plurality of storage sections for storing image data and an image processing apparatus are connected to one another via a communication network, the storage medium including a password certificating program comprising the steps of:

inputting a storage section ID for specifying a storage section and a password for the storage section ID;

transmitting the input password to the image forming apparatus;

receiving bit train data indicating a storage section permitted to be used among said plurality of storage sections; and certificating the password input from the input section on a basis of the comparison between the received bit train data and the storage section ID input from the input section.

* * * * *